May 3, 1949.  H. E. NORDQUIST  2,468,835
VEHICLE SPRING CONSTRUCTION
Filed April 15, 1944
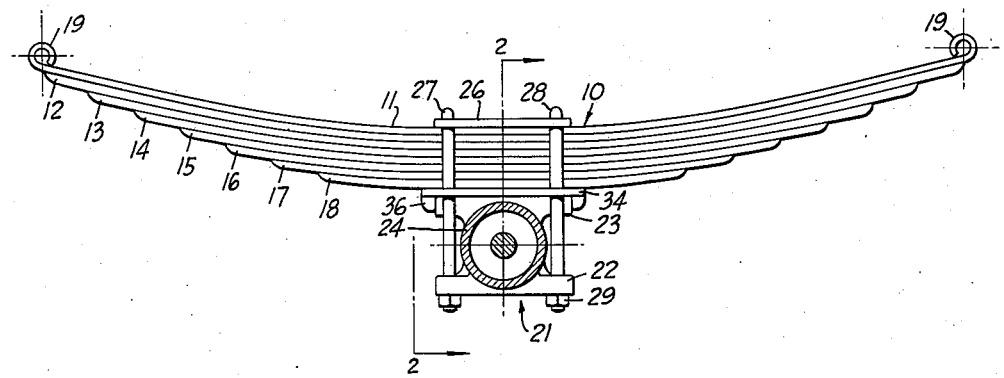
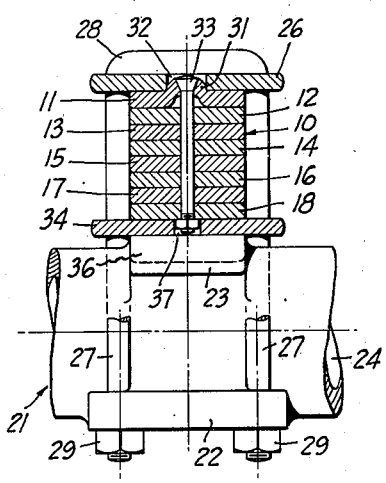 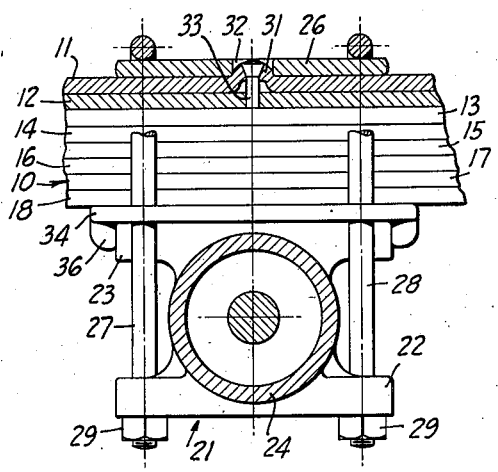
INVENTOR.
Harry E. Nordquist
BY Paul D. Flehr
ATTORNEY

UNITED STATES PATENT OFFICE 2,468,835

VEHICLE SPRING CONSTRUCTION

Harry E. Nordquist, Seattle, Wash., assignor to Laher Spring & Tire Corp., Oakland, Calif., a corporation of Oregon Application April 15, 1944, Serial No. 531,187

2 Claims. (Cl. 267—52)

1

This invention relates generally to the construction of springs of the leaf type such as are employed on various vehicles, including motor trucks and the like.

It is an object of the invention to provide a spring construction which will afford an improved anchorage to parts of the vehicle with which the spring is used, and which is particularly adapted to withstand the forces encountered in heavy duty service.

A further object of the invention is to provide an improved construction such as indicated above, which will adequately cope with forces tending to cause displacement of the main leaf in a longitudinal direction with respect to its mounting on the vehicle.

Further objects of the invention will appear from the following description in which the preferred embodiment has been set forth in detail in conjunction with the accompanying drawing.

Referring to the drawing:

Fig. 1 is a side elevational view illustrating a spring construction incorporating the present invention.

Fig. 2 is a cross-sectional detail taken along the line 2—2 of Fig. 1.

Fig. 3 is an enlarged side elevational detail, showing portions in cross-section.

That particular form of the invention illustrated in the drawing is intended as a rear spring suspension for motor trucks. It will be apparent however that the invention can be applied to both front and rear springs, and may be used with a wide variety of vehicles. Referring to the drawing the invention as illustrated consists of a semi-elliptical leaf spring 10 made up of a plurality of individual spring leaves, which are superposed together. The number of leaves may of course vary in different instances, but in this instance seven leaves are employed, which are numbered 11 to 18 inclusive, commencing with the main top leaf. The ends 19 of the top leaf are formed for attachment with conventional spring shackles.

The central portion of the spring assembly is attached to a saddle which has been generally designated at 21. In this instance the saddle consists of the pads 22 and 23, which are formed integrally with the tubular shaft housing 24. In place of having the pads 22 and 23 integral with the shaft housing, it is evident that they may be separate parts adapted to be suitably retained upon a shaft or shaft housing.

Upon the top spring 11 there is a saddle plate 26 which is generally above the location of the mounting saddle 21. This plate is adapted to

2 receive clamping means, as for example it is provided with openings to receive the U-shaped clamping bolts 27 and 28. These bolts are shown extending in close proximity with the edges of pad 23, and through openings in the lower pad 22. By tightening the nuts 29 on the lower ends of bolts 27 and 28 plate 26 can be firmly clamped down on the leaves.

An interlock is established between plate 26 and the top spring leaf 11. In this instance the interlock is formed by a struck up portion 31 in the center of the main leaf 11 which is accommodated within an opening 32 formed centrally of the plate 26. Thus any forces tending to shift the top leaf in a longitudinal direction are transmitted directly to the plate 26, and from this plate to the U bolts 27 and 28. An opening is formed in the struck up portion 31, and is aligned with central openings in the remainder of the leaves, to accommodate the center retaining bolt 33. This bolt corresponds to the conventional center bolt used on leaf springs, but as will be presently explained it is not subjected to the severe stresses encountered in conventional assemblies.

Interposed between the bottom of leaf 18 and the saddle pad 23 there is a second saddle plate 34. This plate has openings or slots to accommodate the U bolts 27 and 28, and its end portions have depending lugs 36 which are in proximity with the adjacent ends of the pad 23. Thus plate 34 is locked with respect to longitudinal movement relative to the saddle pad 23 and it is likewise locked against movement transversely of the length of the spring because of the close proximity of U bolts 27 and 28 to the sides of the pad 23 (see Fig. 2). Plate 34 can be provided with an opening 37 to accommodate the projecting lower end of center bolt 33.

Operation of the invention described above can be explained as follows: Assuming its use on motor trucks, particularly where there is relatively severe service, such as dump trucks or logging trucks, heavy forces are frequently applied to the ends of the top leaf 11 in a direction tending to displace this spring longitudinally. In conventional constructions such forces must be taken almost entirely by the center bolt, and thus it is common to have this center bolt sheared. However with my construction such forces are transmitted by the struck out portion 31 to the upper plate 26, and this plate in turn transmits the forces to the U bolts 27 and 28. These U bolts in turn transmit the forces directly to the saddle pads 22 and 23, particularly by virtue of the interlock between the plate 34, and the pad 23. Thus no stresses are carried by the center bolt 33, and this center bolt is simply required to retain the remainder of the leaves in proper position. My construction is therefore definitely superior to conventional springs and is capable of giving long useful life under heavy duty service.

I claim:

1. In a vehicle spring construction for application to a vehicle axle, a plurality of superposed spring leaves, mounting means below the lower leaf comprising vertically spaced pads rigidly secured to the axle, a saddle plate adjacent the upper side of the top main leaf and located generally above the upper pad, a thrust transmitting interlock between an integral portion of the top leaf and a medial portion of the plate to prevent longitudinal displacement of the uppermost leaf relative to the plate, a second saddle plate interposed between the lowermost leaf and the upper pad, means serving to lock said last plate against longitudinal movement with respect to its associated pad, and bolts extending through aligned holes provided in both said plates and in the lower pad and serving to clamp the leaves together and upon the second named saddle plate, said bolts being in close proximity with the adjacent side edges of the leaves.

2. In a vehicle spring construction for application to a vehicle axle, a plurality of superposed spring leaves, mounting means below the lower leaf comprising vertically spaced pads rigidly secured to the axle, a saddle plate adjacent the upper side of the top and main leaf and located generally above the upper pad, an opening in the plate intermediate its end and side edges, a thrust transmitting portion extending upwardly from the top face of the upper leaf and accommodated within said opening to thereby form a thrust transmitting connection, a second saddle plate interposed between the lowermost leaf and the upper pad, lugs on the second plate serving to interlock said plate to said upper pad to thereby prevent displacement of the second plate in a direction longitudinally of the spring, both said plates and said lower pad having aligned holes in the same, and rigid vertical U bolts extending through said aligned holes in close juxtaposition to the edges of the spring leaves, said bolts serving to transmit thrust applied to the upper saddle plate from the top spring leaf to the lower pad and to the upper pad through the second saddle plate.

HARRY E. NORDQUIST.

REFERENCES CITED

The following references are of record in the file of this patent:

UNITED STATES PATENTS

| Number | Name | Date |
|---|---|---|
| 863,565 | Athons | Aug. 13, 1907 |
| 1,316,017 | Clemens | Sept. 16, 1919 |
| 1,499,654 | Haselherst | July 1, 1924 |
| 1,522,511 | Gleason | Jan. 13, 1925 |
| 1,539,070 | Brown | May 26, 1925 |

FOREIGN PATENTS

| Number | Country | Date |
|---|---|---|
| 665,188 | France | Apr. 30, 1929 |